US012534353B2

(12) United States Patent
Raymond

(10) Patent No.: US 12,534,353 B2
(45) Date of Patent: Jan. 27, 2026

(54) MIXING TOOL WITH A PAINT CAN OPENER

(71) Applicant: Daniel J. Raymond, Saginaw, MI (US)

(72) Inventor: Daniel J. Raymond, Saginaw, MI (US)

(73) Assignee: Daniel J. Raymond, Saginaw, MI (US)

( * ) Notice: Subject to any disclaimer, the term of this patent is extended or adjusted under 35 U.S.C. 154(b) by 1072 days.

(21) Appl. No.: 17/495,522

(22) Filed: Oct. 6, 2021

(65) Prior Publication Data

US 2022/0024743 A1 Jan. 27, 2022

Related U.S. Application Data

(63) Continuation of application No. 16/793,418, filed on Feb. 18, 2020, now Pat. No. 11,498,821.

(60) Provisional application No. 62/808,040, filed on Feb. 20, 2019.

(51) Int. Cl.

| | |
|---|---|
| ***B67B 7/44*** | (2006.01) |
| ***B01F 27/053*** | (2022.01) |
| ***B01F 27/1125*** | (2022.01) |
| ***B01F 33/501*** | (2022.01) |
| ***B44D 3/08*** | (2006.01) |
| ***B67B 7/12*** | (2006.01) |
| *B01F 101/30* | (2022.01) |

(52) U.S. Cl.

CPC .............. *B67B 7/44* (2013.01); *B01F 27/053* (2022.01); *B01F 27/11251* (2022.01); *B01F 33/50115* (2022.01); *B44D 3/08* (2013.01); *B67B 7/12* (2013.01); *B01F 2101/30* (2022.01)

(58) Field of Classification Search

CPC ..................... B01F 33/50115; B01F 27/11251

See application file for complete search history.

(56) References Cited

U.S. PATENT DOCUMENTS

| | | | | |
|---|---|---|---|---|
| 3,720,270 | A * | 3/1973 | Pasquale | B01F 27/13 173/217 |
| 6,247,837 | B1 * | 6/2001 | Wardberg | B01F 33/50115 366/129 |
| D488,956 | S * | 4/2004 | Boyle | B01F 27/13 D7/412 |
| 9,914,101 | B1 * | 3/2018 | Schrudder | B01F 33/50115 |
| 2013/0135962 | A1 * | 5/2013 | Floyd | B01F 33/50115 366/279 |
| 2014/0084551 | A1 * | 3/2014 | Brawley | B01F 35/421 279/140 |
| 2016/0310917 | A1 * | 10/2016 | Morton | B01F 27/13 |
| 2018/0369766 | A1 * | 12/2018 | Greene | B01F 29/31 |

FOREIGN PATENT DOCUMENTS

FR 3050918 A1 * 11/2017

* cited by examiner

*Primary Examiner* — Marc C Howell
(74) *Attorney, Agent, or Firm* — Dickinson Wright PLLC

(57) ABSTRACT

The mixing tool is for opening a container and for mixing a product contained in the container. The tool includes a mixing device which is shaped to mix the product contained in the container. A shank extends along a length from the mixing device to an end face. A channel is formed into the end face for receiving an edge of a lid of the container to allow the tool to be used to pry the lid off of the container.

8 Claims, 4 Drawing Sheets

MIXING TOOL WITH A PAINT CAN OPENER

CROSS-REFERENCE TO RELATED APPLICATION

This Continuation application claims the benefit of U.S. patent application Ser. No. 16/793,418, filed Feb. 18, 2020, and titled "MIXING PADDLE TOOL SHANK" and also claims the benefit of U.S. Provisional Patent Application No. 62/808,040, filed Feb. 20, 2019, and titled "MIXING PADDLE TOOL SHANK", the entire contents of which is herein incorporated by reference.

BACKGROUND OF THE INVENTION

1. Field of the Invention

The subject application is related generally to tools and, more particularly, to tools for use in painting.

2. Related Art

Painters typically use either a specially designed paint can opener or a regular (flathead) screwdriver to detach the lids of paint cans. Once a lid has been removed from a paint can, the paint contained therein must be thoroughly and rigorously mixed with a mixing stick. Thus, two completely independent tools are conventionally required to accomplish these tasks (lid removal and mixing). This increases the chances that either one of the tools could be forgotten, get lost, or break.

SUMMARY OF THE INVENTION AND ADVANTAGES

One aspect of the present invention is related to a tool for opening a container and for mixing a product contained in the container. The tool includes a mixing device which is shaped to mix the product contained in the container. A shank extends along a length from the mixing device to an end face. A channel is formed into the end face for receiving an edge of a lid of the container to allow the tool to be used to pry the lid off of the container.

According to another aspect of the present invention, the shank has a hexagonal shape as viewed in cross-section along most of its length.

According to yet another aspect of the present invention, the channel extends linearly from one corner of the hexagonal shape of the shank to an opposite corner.

According to still another aspect of the present invention, the end face of the shank is symmetrical about a plane which extends through the channel.

According to a further aspect of the present invention, the end face of the shank is symmetrical about a plane which extends perpendicularly across the channel.

According to yet a further aspect of the present invention, the mixing device is a mixing paddle.

According to still a further aspect of the present invention, the mixing paddle is generally kite-shaped.

According to another aspect of the present invention, the shank includes a groove which extends around the shank and which is spaced from the end face, and the channel extends approximately half a distance from the end face to the groove.

According to yet another aspect of the present invention, the mixing device and the shank are made of different materials.

According to still another aspect of the present invention, the mixing device is made of plastic, and the shank is made of metal.

Another aspect of the present invention is related to a method of opening and mixing the contents of a container. The method includes the step of preparing a mixing tool which includes a mixing device that is shaped to mix the product contained in the container, a shank which extends along a length form the mixing device to an end face, and a channel formed into the end face of the shank. The method proceeds with the step of inserting an edge of a lid of the container into the channel of the shank. The method continues with the step of prying the lid open using the mixing tool to expose the contents of the container. The method proceeds with the step of inserting a portion of the shank into the chuck of a drill or an impact driver. The method continues with the step of inserting the mixing device into the contents of the container. The method proceeds with the step of activating the drill or impact driver to mix the contents of the container with the mixing paddle.

According to another aspect of the present invention, the mixing device is a mixing paddle.

According to yet another aspect of the present invention, the mixing device is a mixing paddle.

According to still another aspect of the present invention, the mixing device is made of plastic.

According to a further aspect of the present invention, the shank is made of metal.

According yet a further aspect of the present invention, the shank has a hexagonal shape along most of its length.

According to still a further aspect of the present invention, the channel extends linearly from one corner of the hexagonal shape of the shank to an opposite corner of the hexagonal shape of the shank.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
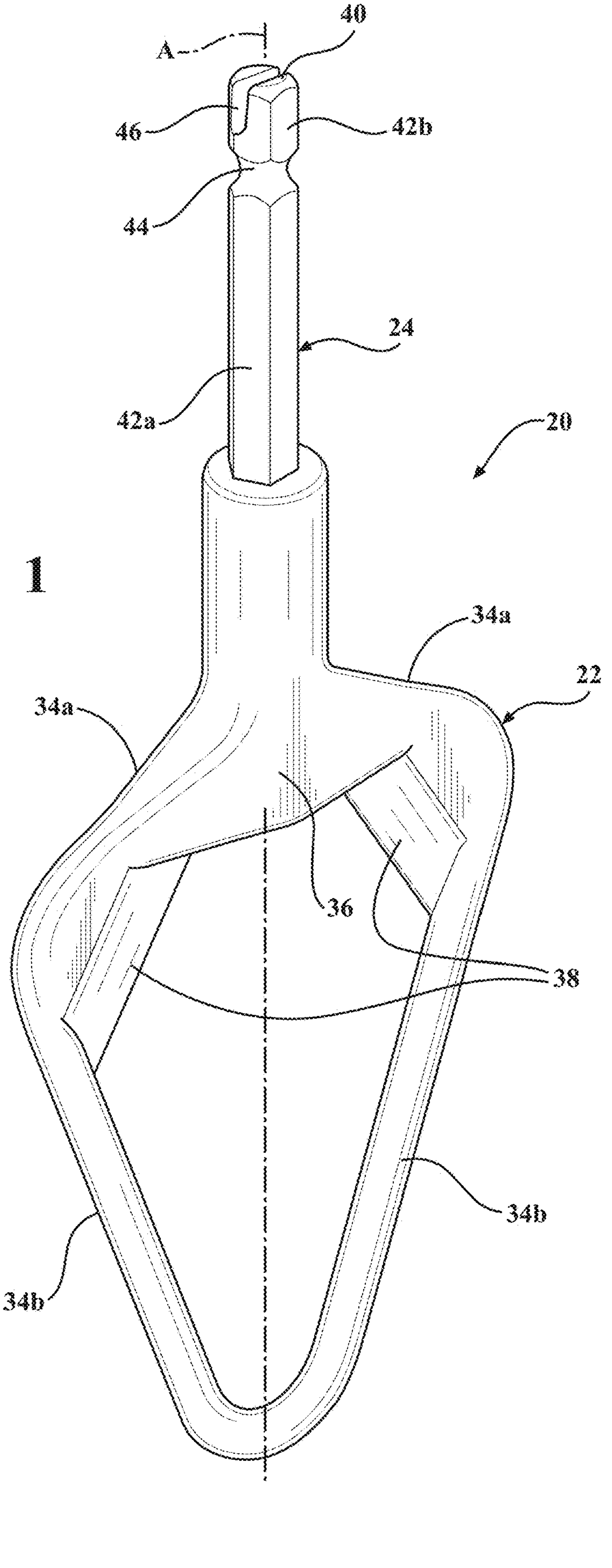
FIG. 1 is a perspective view of an exemplary embodiment of a mixing tool.

Referring to the Figures, wherein like numerals indicate corresponding parts throughout the several views, an exemplary embodiment of an improved mixing tool 20 is generally shown in FIG. 1. The mixing tool 20 includes a mixing paddle 22 and a shank 24 which extends outwardly from the mixing paddle 22 to be received in the chuck 26 of an impact driver or hand-held drill 28. As discussed in further detail below, the mixing tool 20 is conveniently configured to both open containers (such as paint cans 30) and also mix product (such as paint 32) contained in those cans 30.

In the exemplary embodiment, the mixing paddle 22 is generally kite-shaped with two pairs of sides 34*a*, 34*b* and wherein the lengths of the sides 34*a*, 34*b* in each pair are equal but the lengths of the sides 34*a* in one pair are different than the lengths of the sides 34*b* in the other pair. More specifically, the mixing paddle 22 includes a pair of short sides 34*a* that meet at the shank 24 and diverge away from one another in a direction away from the shank 24. The mixing paddle 22 also includes a pair of long sides 34*b* which extend from the ends of the short sides 34*a* and converge together at a rounded end corner. Rounded corners connect adjacent sides with one another. The mixing paddle 22 further includes a reinforcement 36 with an increased wall thickness adjacent the shank 24 for strengthening the mixing paddle 22 in this area where stresses from the mixing paddle 22 rotating are transferred to the shank 24 during a mixing operation. The mixing paddle 22 also includes a pair of flanges 38 which extend from the reinforcement 38 to the long sides 34*b* for improved mixing performance. Each of the flanges 38 has a progressively decreasing thickness in a direction towards the rounded end. The mixing paddle 22 is preferably made of plastic and is shaped through an injection molding operation.

The shank 24 extends along an axis A from the mixing paddle 22 to an end face 40. The shank 24 has two hexagonal portions 42*a*, 42*b* that are separated from one another by a groove 44 with a circular cross-sectional shape. That is, the shank 24 has a first hexagonal portion 42*a* which extends from the mixing paddle 22 to the groove 44 and a second hexagonal portion 42*b* which extends from the groove 44 to the end face 40. Each of the hexagonal portions 42*a*, 42*b* has a width, and the groove 44 has a diameter that is less than the width. The shank 24 is configured such that the end face can be inserted into the chuck 26 of an impact driver or a hand-held drill 28. The shank 24 is preferably made of metal, such as steel or an alloy steel, and may be shaped through any suitable operation including, for example, casting or forging. The shank 24 may have any suitable length from the mixing paddle 22 to the end face 40. For example, in various embodiments, the length of the shank 24 is three inches (3"), six inches (6"), nine inches (9"), and twelve inches (12").

Figure 2:
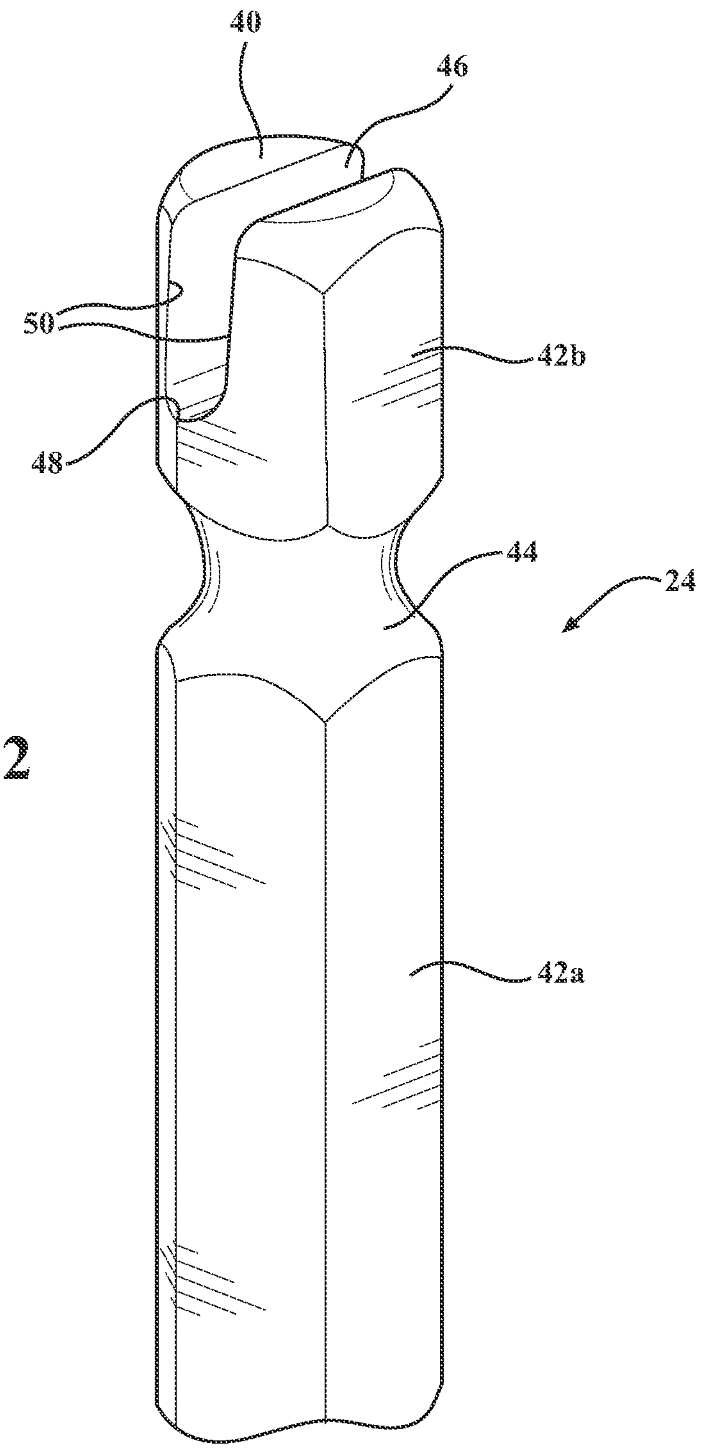
FIG. 2 is an enlarged view of a portion of the mixing tool of FIG. 1.

As shown in FIG. 2, in the first hexagonal portion 42*a*, the shank 24 has a linearly extending channel 46 (or cutout) that opens at the end face 40 of the shank 24 for allowing the shank 24 to be used to open containers, such as paint cans 30. The channel 46 is generally U-shaped with a round bottom 48 and parallel sides 50 that extends into the shank 24 from the end face 40 towards the groove 44. In the exemplary embodiment, the round bottom 48 is located approximately halfway between the end face 40 and a center area of the groove 44 in an axial direction. In a widthwise direction, the shank 24 extends from one of the corners of the hexagonal shape to an opposite corner and is open on both sides of the shank 24. Thus, the end face 40 of the shank 24 is symmetrical about a plane which extends through and along the channel 46 and about a plane which extends perpendicularly to the channel 46. This configuration of the channel 46 allows one of the sides of the hexagonal shape to sit in a groove of the paint when an edge of a lid 52 of the paint can 30 during an opening operation, thus allowing for easier opening of paint cans 30. The channel 46 can be formed into the shank 24 either during its initial fabrication or it can be cut into the shank 24 after forming. In the exemplary embodiment, the perimeter of the end face 40 is chamfered in the areas on either side of the channel 46.

Figure 3:
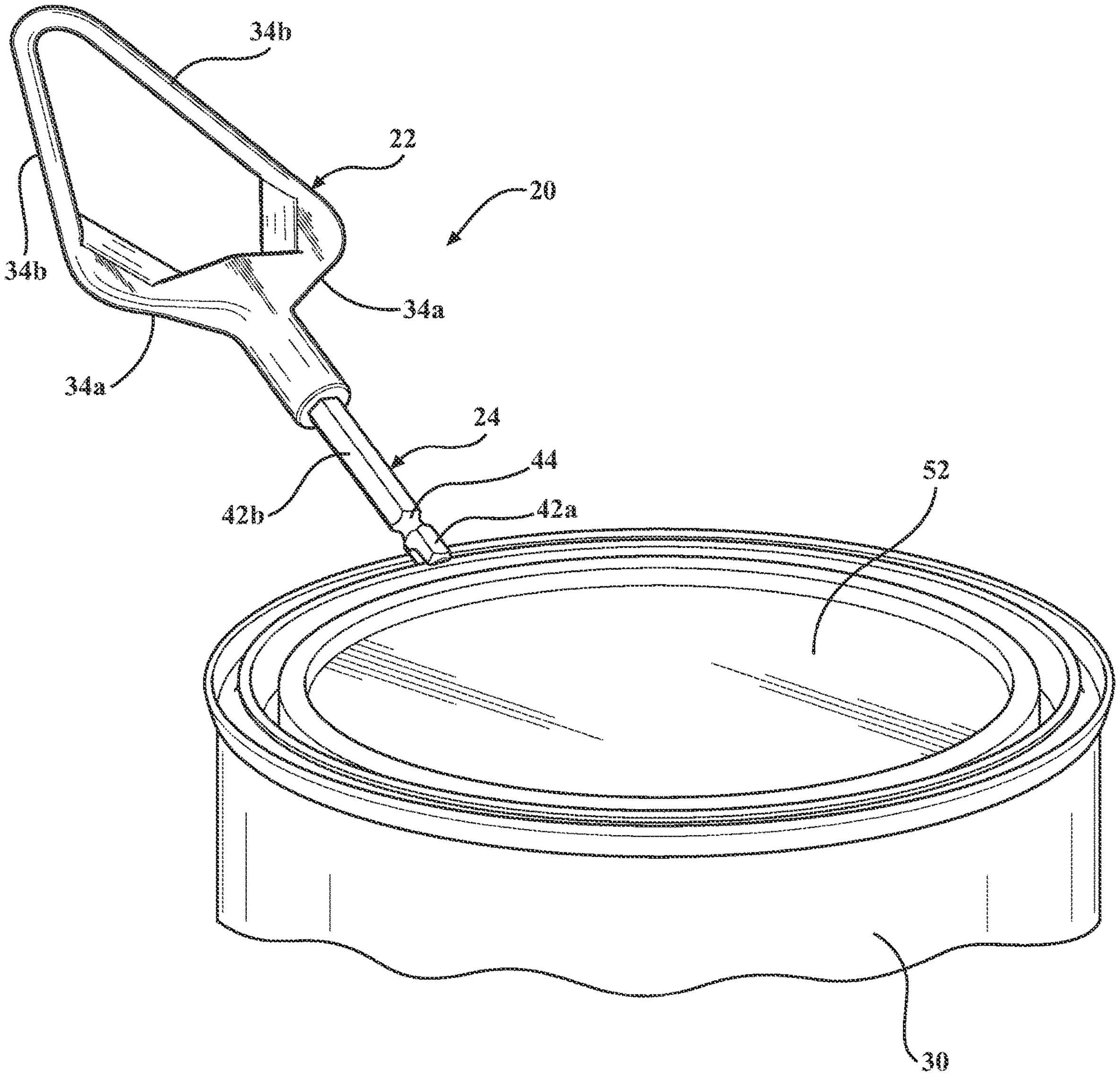
FIG. 3 is a perspective view showing the mixing tool of FIG. 1 being used to open a can of paint.
Figure 4:
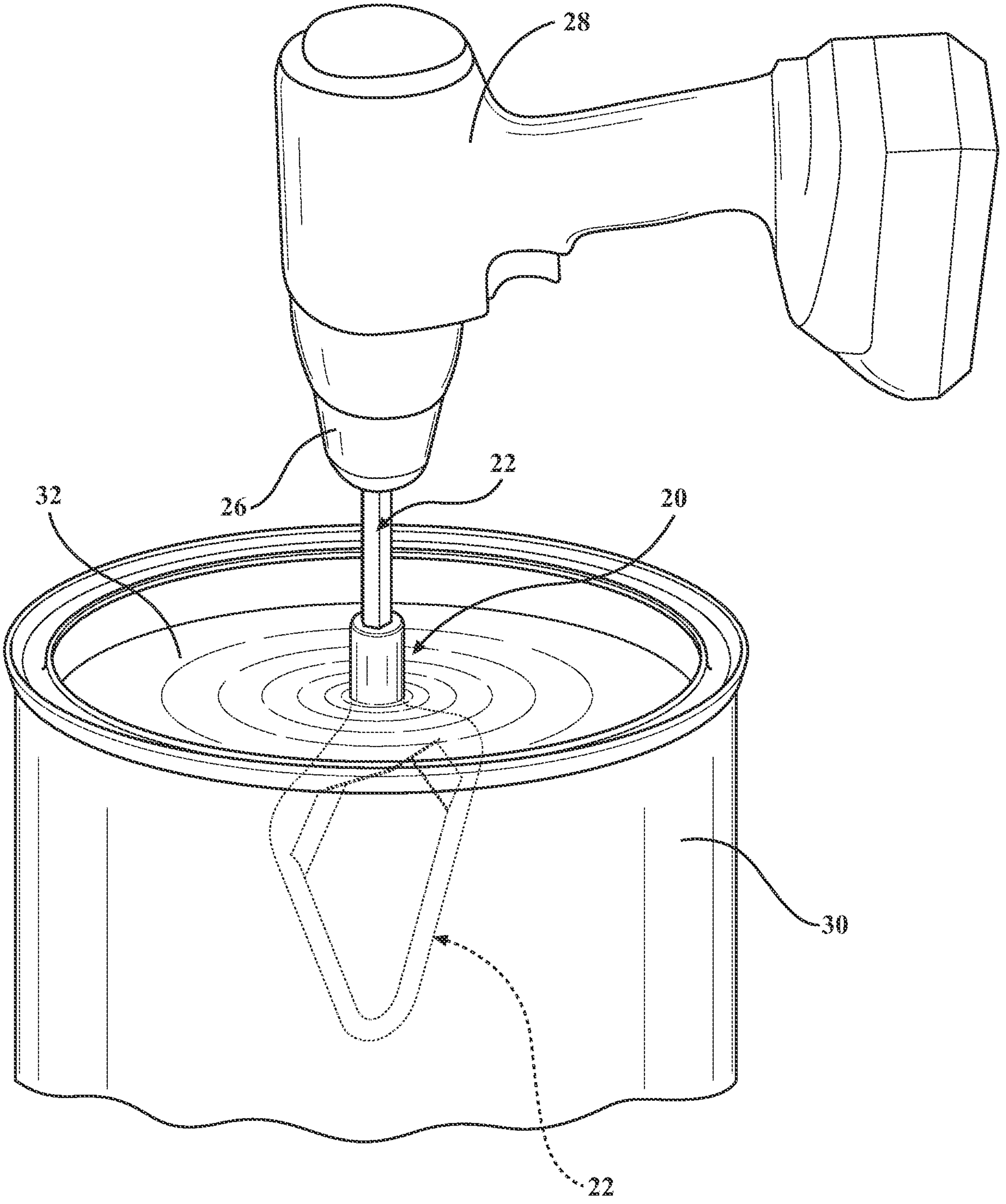
FIG. 4 is a perspective view showing the mixing tool of FIG. 1 being used to mix a can of paint.

In use, a user inserts the edge of the lid 52 of the paint can 30 (or other type of container) into the channel 46 formed at the end face 40 of the shank 24 and then uses leverage by forcing the shank 24 against an upper edge of the paint can 30 urging the length of the shank 24 and/or the mixing paddle 22 downwardly to pry the lid 52 open and, as shown in FIG. 3. As shown in FIG. 4, the user can then insert the shank 24 into the chuck 26 of his or her impact driver or drill 28 and tighten the chuck 26. Once the chuck 26 has been sufficiently tightened, the user can insert the mixing paddle 22 into the paint 32 (or other product contained within the container) and use the impact driver or drill 28 to rotate the mixing paddle 22 and mix the paint 32.

The exemplary embodiment of the mixing tool 20 thus serves multiple related purposes that are often in a single, handy and very durable contraption which can be made at very low cost, as opposed to two separate devices. Further, the features which allow for these multiple purposes to be served are harmonious with one another in that neither in any way inhibits the performance of the other. That is, the channel 46, which allows the mixing tool 20 to remove the lid 52 from the paint can 30 (or other container), does not impair the performance of the mixing paddle 22, which allows the mixing tool to mix the paint 32 (or other contents), and likewise, the mixing paddle 22 does not impair the performance of the channel 46.

Obviously, many modifications and variations of the present invention are possible in light of the above teachings and may be practiced otherwise than as specifically described while within the scope of the appended claims.

What is claimed is:

1. A tool for opening a container and for mixing a product contained in the container, comprising:

a mixing device shaped to mix the product contained in the container; and a shank extending along a length from the mixing device to an end face and having two hexagonal portions that are separated from one another by a groove which extends circumferentially around the shank to allow said shank to attach with an impact driver, wherein said mixing device is a mixing paddle, wherein said mixing paddle is generally kite-shaped, wherein said mixing paddle includes a pair of first sides that diverge away from one another in a direction away from said shank, and a pair of second sides that converge from the first sides toward one another to a rounded end of said mixing paddle, wherein a pair of flanges extend from said pair of first sides toward said round end.

2. The tool as set forth in claim 1 wherein said mixing device and said shank are made of different materials.

3. The tool as set forth in claim 2 wherein said mixing device is made of plastic and said shank is made of metal.

4. The tool as set forth in claim 1 wherein said pair of flanges have a progressively decreasing thickness in a direction toward said rounded end.

5. A tool for mixing a product contained in a container, comprising:

a mixing paddle shaped to mix the product contained in the container; and a shank extending along a length from the mixing paddle to an end face configured for coupling with a power tool, wherein said mixing paddle includes a pair of first sides that diverge away from one another in a direction away from said shank, and a pair of second sides that converge from the first sides toward one another to a rounded end of said mixing paddle, wherein a pair of flanges extend from said pair of first sides toward said round end.

6. The tool as set forth in claim 5 wherein said pair of flanges have a progressively decreasing thickness in a direction toward said rounded end.

7. The tool as set forth in claim 5 wherein said first sides and said second sides define said mixing paddle being generally kite-shaped.

8. The tool as set forth in claim 5 wherein a channel extends into said end face of said shank for receiving an edge of a lid of the container in said channel to pry a lid off the container with said tool.

* * * * *